United States Patent
Freeman et al.

(10) Patent No.: US 7,698,528 B2
(45) Date of Patent: Apr. 13, 2010

(54) SHARED MEMORY POOL ALLOCATION DURING MEDIA RENDERING

(75) Inventors: Arthur William James Freeman, Kirkland, WA (US); Olivier Colle, Redmond, WA (US); James C. Finger, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/823,510

(22) Filed: Jun. 28, 2007

(65) Prior Publication Data

US 2009/0006771 A1 Jan. 1, 2009

(51) Int. Cl.
G06F 12/00 (2006.01)

(52) U.S. Cl. .................. 711/170; 345/543; 345/619; 345/668

(58) Field of Classification Search .............. 345/543, 345/619, 668; 711/170
See application file for complete search history.

(56) References Cited

U.S. PATENT DOCUMENTS

| | | | |
|---|---|---|---|
| 6,205,522 B1 | 3/2001 | Hudson et al. | |
| 6,473,379 B1 | 10/2002 | Kim et al. | |
| 6,490,250 B1* | 12/2002 | Hinchley et al. | 370/232 |
| 6,578,109 B1 | 6/2003 | Stone et al. | |
| 6,775,467 B1 | 8/2004 | Su | |
| 7,080,228 B2 | 7/2006 | Huras et al. | |
| 7,266,132 B1* | 9/2007 | Liu et al. | 370/538 |
| 2005/0030971 A1 | 2/2005 | Yuan | |
| 2006/0041895 A1 | 2/2006 | Berreth | |
| 2006/0179196 A1 | 8/2006 | Gray | |
| 2006/0251064 A1 | 11/2006 | Yeh et al. | |
| 2007/0025697 A1 | 2/2007 | Kim et al. | |
| 2008/0049036 A1* | 2/2008 | Chang | 345/558 |

OTHER PUBLICATIONS

Hugh Bennett, EMediaLive.com: The Authoritative BD FAQ: II. Physical, Logical, and Application Specification. http://www.emedialive.com/Articles/ReadArticle.aspx?ArticleID+11397 - posted Jun. 1, 2006, pp. 1-5.
Peter Torr: "Adding Picture-In-Picture to an HD DVD Title," http://blogs.msdn.com/ptorr/archive/2006/09/11/750124.aspx - posted Sep. 11, 2006, pp. 1-3.
Author Unknown, "Third Party Products" http://www.dts.com/pro-audio/3rd.php Date: 2007, pp. 1-2.

* cited by examiner

*Primary Examiner*—Hong Kim
(74) *Attorney, Agent, or Firm*—Mayer & Williams PC

(57) ABSTRACT

Memory management techniques involve establishing a memory pool having an amount of sharable memory, and dynamically allocating the sharable memory to concurrently manage multiple sets of sequenced units of digital data. In an exemplary scenario, the sets of sequenced units of digital data are sets of time-ordered media samples forming clips of media content, and the techniques are applied when media samples from two or more clips are simultaneously presentable to a user as independently-controlled streams. Variable amounts of sharable memory are dynamically allocated for preparing upcoming media samples for presentation to the user. In one possible implementation, a ratio of average data rates of individual streams is calculated, and amounts of sharable memory are allocated to rendering each stream based on the ratio. Then, the sharable memory allocated to rendering individual streams is reserved as needed to prepare particular upcoming media samples for presentation to the user.

20 Claims, 6 Drawing Sheets

SHARED MEMORY POOL ALLOCATION DURING MEDIA RENDERING

BACKGROUND

The effective processing of digital data is often dependent on the efficient use of limited computing resources such as memory. The term memory can encompass any type of computer-readable storage medium, although memory used by computers in the processing of digital data is often random access memory. Often, fixed amounts of memory for processing digital data are pre-allocated. Sometimes, however, such fixed memory allocations are inefficient. One situation where inefficiencies can occur is when multiple sets of sequenced units of digital data are to be processed concurrently.

It is desirable to enhance the efficient use of memory for processing sequenced digital data in general, and for rendering of digital media content in particular. Digital media content is comprised of sequenced samples of video, audio, images, text, and/or graphics. When media content players present such sequenced samples to users, they are referred to as streams of media content.

Newer media content players are configured to concurrently render more than one independently-controlled stream of media content (for example, a main movie along with features such as a director's commentary, actor biographies, or advertising). Such media content players may also be capable of rendering user-selectable visible or audible objects (for example, various menus, games, special effects, or other options) concurrently with one or more streams of media content. Rendering of media content—especially concurrently playing, independently-controlled media content streams—can consume significant amounts of limited player resources, particularly memory.

SUMMARY

Memory management techniques discussed herein involve establishing a memory pool having an amount of sharable memory, and dynamically allocating the sharable memory to concurrently manage multiple sets of sequenced units of digital data. In an exemplary scenario, the sets of sequenced units of digital data are sets of time-ordered media samples, such as bits, frames, groups of pictures, video object units, and the like. In the context of media content, the techniques discussed herein are generally applied when media samples from two or more sets are simultaneously presentable to a user as independently-controlled streams of media content. It will be appreciated, however, that other scenarios are possible, and that the techniques discussed herein are applicable to any contemporaneously processed sequenced units of digital data.

Specific memory management techniques involve ascertaining one resource consumption indicator associated with processing some of the units of digital data in a first set of sequenced units of digital data, and ascertaining another resource consumption indicator associated with processing some of the units of digital data in a second set of sequenced units of digital data. Resource consumption may vary based on various factors, including but not limited to factors associated with the digital data, the computing system used to process the digital data, and user input. Once ascertained, the resource consumption indicators are compared, and the sharable memory is dynamically allocated based on the comparison.

Sometimes, available sharable memory is insufficient for immediate implementation of a desired memory allocation. Then, the available sharable memory may be allocated in accordance with a priority scheme to avoid processing glitches. In one scenario, a higher priority is given to assigning sharable memory to acts associated with processing the set(s) of units of digital data having the largest resource consumption. The set(s) of units of digital data having lower resource consumption may be required to repeatedly re-request resources. Alternatively, such sets may be assigned pending memory requests, which are given priority as sharable memory resources become available. In this manner, it is possible for to ensure the efficient, dynamic allocation of sharable memory when multiple sets of sequenced units of digital data are to be concurrently processed.

In the case of media content streams, the resource consumption indicators are data rates (for example, average data rates) associated with rendering individual media content streams. Memory resources required to process media content streams having certain data rates (and to process particular media samples within such streams) may vary based on various factors, including but not limited to factors associated with the media samples themselves (for example, media sample sources/locations, media sample sizes, encoding and/or decoding parameters, and encryption parameters, among others), the media content player (for example, player architecture or dynamic processing loads, among others), or user input (user-selected media content formats or user-selected play speeds such as fast-forward, slow-forward, fast-reverse, or slow-reverse, for example). A ratio of data rates of individual streams of media content is calculated, and sharable memory is dynamically allocated based on the comparison. When available sharable memory is insufficient for immediate implementation of a desired memory allocation, one possible priority scheme ensures that sharable memory is first assigned to acts associated with processing the media content stream that currently has less than its allocated portion of the sharable memory.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. Moreover, the claimed subject matter is not limited to implementations that solve any or all disadvantages noted in any part of this document.

DETAILED DESCRIPTION

Figure 1:
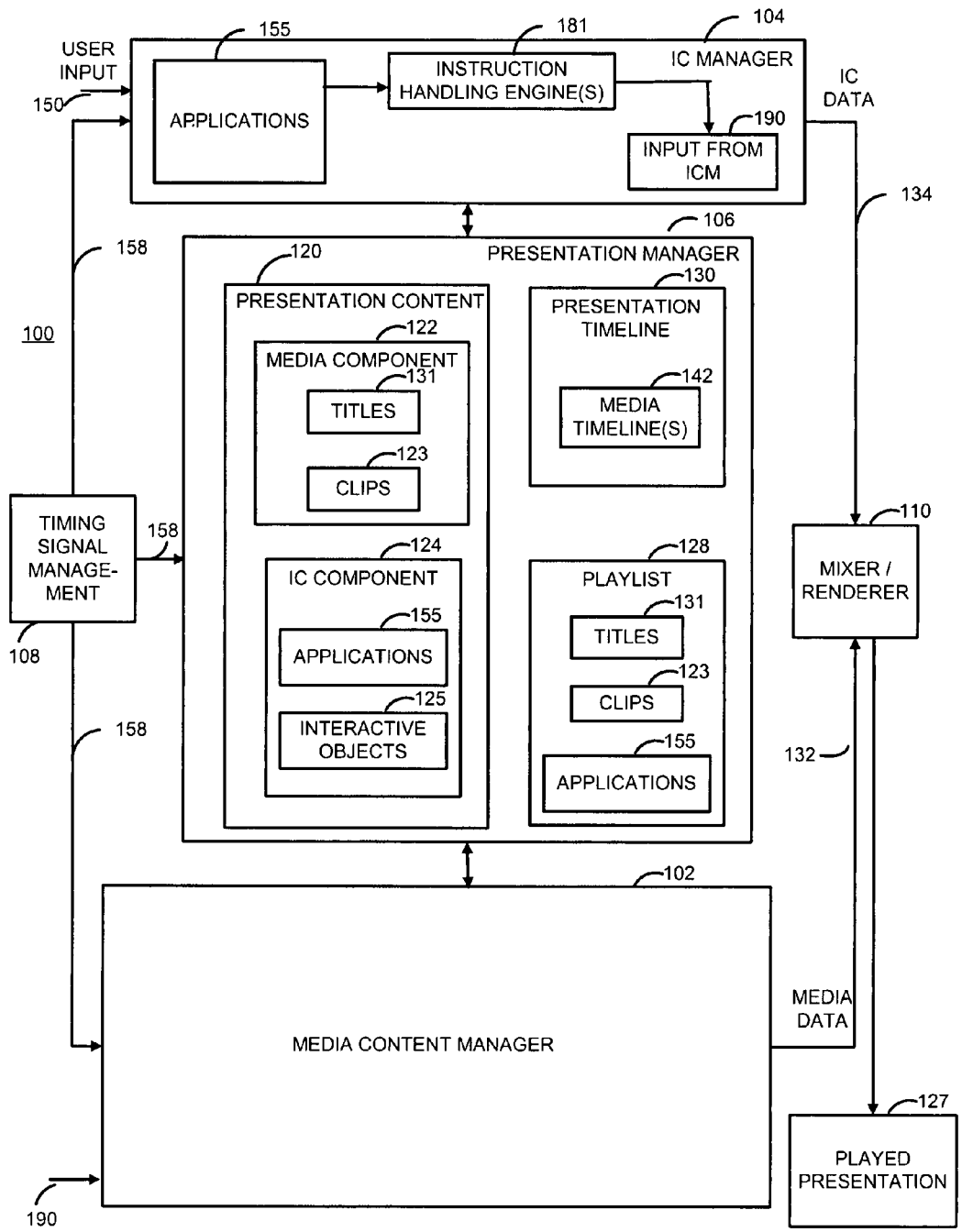
FIG. 1 is a simplified functional block diagram of an exemplary media content player.

Memory management techniques discussed herein dynamically allocate sharable memory from a memory pool to the concurrent processing of multiple sets of sequenced units of digital data. For purposes of example and not limitation, the concurrent rendering of multiple media content streams is specifically discussed, and it will be appreciated that the techniques discussed herein are applicable to any contemporaneously processed sequenced units of digital data.

Certain media content players can render two independently-controlled media content streams at once. High-definition DVD players, for example, are configured to concurrently render a main media content stream (such as a movie) and a secondary media content stream (for example, a special feature such as director's commentary, an actor biography, or an advertisement). Serendipitous user input determines whether and/or when individual media content streams are presented.

To avoid user-perceptible glitches in the presentation of media content, media content rendering generally involves identifying and preparing for presentation one or more upcoming media samples to be presented to a user, prior to the scheduled play time of the media sample(s). Memory resources required to prepare a particular media sample for presentation are not always constant from sample-to-sample. Some factors that affect required memory resources are associated with the media samples themselves (including but not limited to factors such as media sample size, media sample source/location, encoding or decoding parameters, and encryption parameters), but may also be associated with the media content player (for example, player architecture or dynamic processing loads, among others) or user input (user-selected media content formats or user-selected play speeds, for example).

As applied to media content rendering, specific memory management techniques discussed herein involve dynamically allocating variable amounts of sharable memory for preparing particular upcoming media samples for presentation. Once particular media samples have been presented to a user, the allocated amounts of sharable memory may be released and made available for re-allocation.

When a single media content stream is being presented to the user, all available sharable memory may generally be allocated to rendering the single media content stream. As the user independently starts and stops other media content streams, however, the available sharable memory is allocated to more than one stream. In one scenario, the dynamic allocations of sharable memory for preparing particular upcoming media samples from each stream for presentation are based on the relative average data rates of the individual media content streams. In an exemplary implementation, a ratio of data rates (for example, bit rates) of the individual media content streams is calculated, and sharable memory is split based on the ratio of data rates. Then, the sharable memory allocated to an individual stream is reserved as needed to prepare particular upcoming media samples from that stream.

When available sharable memory is insufficient for immediate implementation of a desired memory allocation and/or the sharable memory allocated to an individual stream is insufficient to prepare particular upcoming media samples from that stream, one possible priority scheme ensures that sharable memory is first assigned to acts associated with processing the media content stream being processed by a media processing pipeline that currently has less than its allocated portion of the sharable memory, and a memory request is optionally assigned to the other media content stream. As sharable memory becomes available, it may be allocated to the data stream with a pending memory request.

Turning to the drawings, where like numerals designate like components, FIG. 1 is a simplified functional block diagram of an exemplary media content player 100 that renders media content, which is comprised of sequences (generally, time-ordered) samples of video, audio, images, text, and/or graphics. Although media content player 100 may be any system that renders media content, including but not limited to an optical media player, a computer, an audio player, a set-top box, a telecommunication device, a personal digital assistant, an image recorder, or a video recorder, as shown media content player 100 is an interactive multimedia presentation system (hereafter referred to as "Presentation System 100").

Presentation System 100 includes a media content manager 102, an interactive content ("IC") manager 104, a presentation manager 106, a timing signal management block 108, and a mixer/renderer 110. In general, design choices dictate how specific functions of Presentation System 100 are implemented. Such functions may be implemented using hardware, software, or firmware, or combinations thereof.

In operation, Presentation System 100 handles interactive multimedia presentation content ("Presentation Content") 120. Presentation Content 120 includes a media content component ("media component") 122 and an interactive content component ("IC component") 124. Media component 122 and IC component 124 are generally, but need not be, handled as separate data streams, by media content manager 102 and IC manager 104, respectively.

Presentation System 100 also facilitates presentation of Presentation Content 120 to a user (not shown) as played presentation 127. Played presentation 127 represents the visible and/or audible information associated with Presentation Content 120 that is produced by mixer/renderer 110 and receivable by the user via devices such as displays or speakers (not shown). For discussion purposes, it is assumed that Presentation Content 120 and played presentation 127 represent aspects of high-definition DVD movie content, in any format. It will be appreciated, however, that Presentation Content 120 and Played Presentation 127 may be configured for presenting any type of presentation of media content now known or later developed.

Media component 122 represents one or more sequences (generally, time-ordered) of samples (for example, samples of video, audio, images, text, and/or graphics) presentable to users as media content streams (media content streams 208 and 228 are shown and discussed further below, in connection with FIG. 2). More than one independently-controlled media content stream may be concurrently presented (for example, a main movie along with features such as a director's commentary, actor biographies, or advertising). Although media component 122 is often discussed in the context of a movie, media component 122 may in fact be video, audio, data, or any combination thereof.

A movie generally has one or more versions (a version for mature audiences, and a version for younger audiences, for example); one or more titles 131 with one or more chapters (not shown) associated with each title (titles are discussed further below, in connection with presentation manager 106); one or more audio tracks (for example, the movie may be played in one or more languages, with or without subtitles); and extra features such as director's commentary, additional footage, actor biographies, advertising, trailers, and the like. It will be appreciated that distinctions between titles and chapters are purely logical distinctions. For example, a single perceived media segment could be part of a single title/chapter, or could be made up of multiple titles/chapters. It is up to the content authoring source to determine the applicable logical distinctions.

Sets of media samples (for example, sets of video, audio, or data samples) that form aspects of media component 122 are commonly referred to as clips 123 (clips 123 are shown within media component 122 and playlist 128, and are also referred to in FIG. 2 and discussed further below). It will be appreciated, however, that sets of media samples may be grouped and/or referred to in any desirable manner. Media samples may be represented by any desired unit, for example, bits, frames, data packets, groups of pictures, enhanced video object units, etc. The digital contents of a particular media sample (and also the size of a particular media sample) may be based on several factors, such as the characteristics of the video, audio, or data content comprising the sample, or one or more parameters associated with the media source from which the sample is derived (for example, media source identity and/or location, encoder/decoder parameters or settings, or encryption parameters or settings). Media sources are discussed further below, in connection with FIG. 2.

Media data 132 is data associated with media component 122 that has been prepared for rendering by media content manager 102 and transmitted to mixer/renderer 110. Media data 132 generally includes, for each active clip 123, a rendering of a portion of the clip.

Referring again to Presentation Content 120, IC component 124 includes interactive objects 125, which are user-selectable visible or audible objects, optionally presentable concurrently with media component 122, along with any instructions (shown as applications 155) for presenting the visible or audible objects. Examples of interactive objects include, among other things, video samples or clips, audio samples or clips, images, graphics, text, and combinations thereof.

Applications 155 provide the mechanism by which Presentation System 100 presents interactive objects 125 to a user. Applications 155 represent any signal processing method or stored instruction(s) that electronically control predetermined operations on data.

IC manager 104 includes one or more instruction handling engines 181, which receive, interpret, and arrange for execution of commands associated with applications 155. As execution of applications 155 progresses and user input 150 is received, behavior within played presentation 127 may be triggered. Execution of certain instructions of application 155, labeled as "input from ICM" 190, may facilitate communication or interoperability with other functionality or components within Presentation System 100. As shown, input 190 is received by media content manager 102 (discussed further below, in connection with FIG. 2), but other components or functions within Presentation System 100 may also be responsive to input 190.

Interactive content data ("IC data") 134 is data associated with IC component 124 that has been prepared for rendering by IC manager 104 and transmitted to mixer/renderer 110.

Timing signal management block 108 produces various timing signals 158, which are used to control the timing for preparation and production of media data 132 and IC data 134 by media content manager 102 and IC manager 104, respectively. For example, timing signal management block 108 is generally responsible for determining rates at which media data 132 ("media data presentation rate 307," shown and discussed in connection with FIG. 3) and IC data 134 are presented to a user. In another example, timing signals 158 are used to achieve approximate synchronization of media data 132 and IC data 134 (for example, timing/synchronization on a per-frame basis or on another time basis).

Mixer/renderer renders media data 132 in a video plane (not shown), and renders IC data 134 in a graphics plane (not shown). The graphics plane is generally, but not necessarily, overlayed onto the video plane to produce played presentation 127 for the user.

Presentation manager 106, which is configured for communication with media content manager 102, IC manager 104, mixer/renderer 110, and timing signal management block 108, facilitates handling of Presentation Content 120 and presentation of played presentation 127 to the user. Presentation manager 106 has access to a playlist 128. Playlist 128 includes, among other things, a time-ordered sequence of clips 123 and applications 155 (including interactive objects 125) that are presentable to a user. The clips 123 and applications 155/interactive objects 125 may be arranged to form one or more titles 131. As discussed above, it is possible for more than one independently-controlled title/media content stream to be concurrently played to a user.

Presentation manager 106 uses playlist 128 to ascertain a presentation timeline 130 for a particular title 131. Conceptually, presentation timeline 130 indicates the times within title 131 when specific clips 123 and applications 155 are presentable to a user. In certain circumstances, it is also useful to use playlist 128 and/or presentation timeline 130 to ascertain one or more media content timelines ("media timeline(s)") 142 (an exemplary media timeline 142 is shown and discussed further below, in connection with FIG. 3).

In operation, presentation manager 106 provides information, including but not limited to information about presentation timeline 130 and/or media timeline 142 to media content manager 102 and IC manager 104. Based on input from presentation manager 106, media content manager 102 prepares media data 132 for rendering, and IC manager 104 prepares IC data 134 for rendering.

Figure 2:
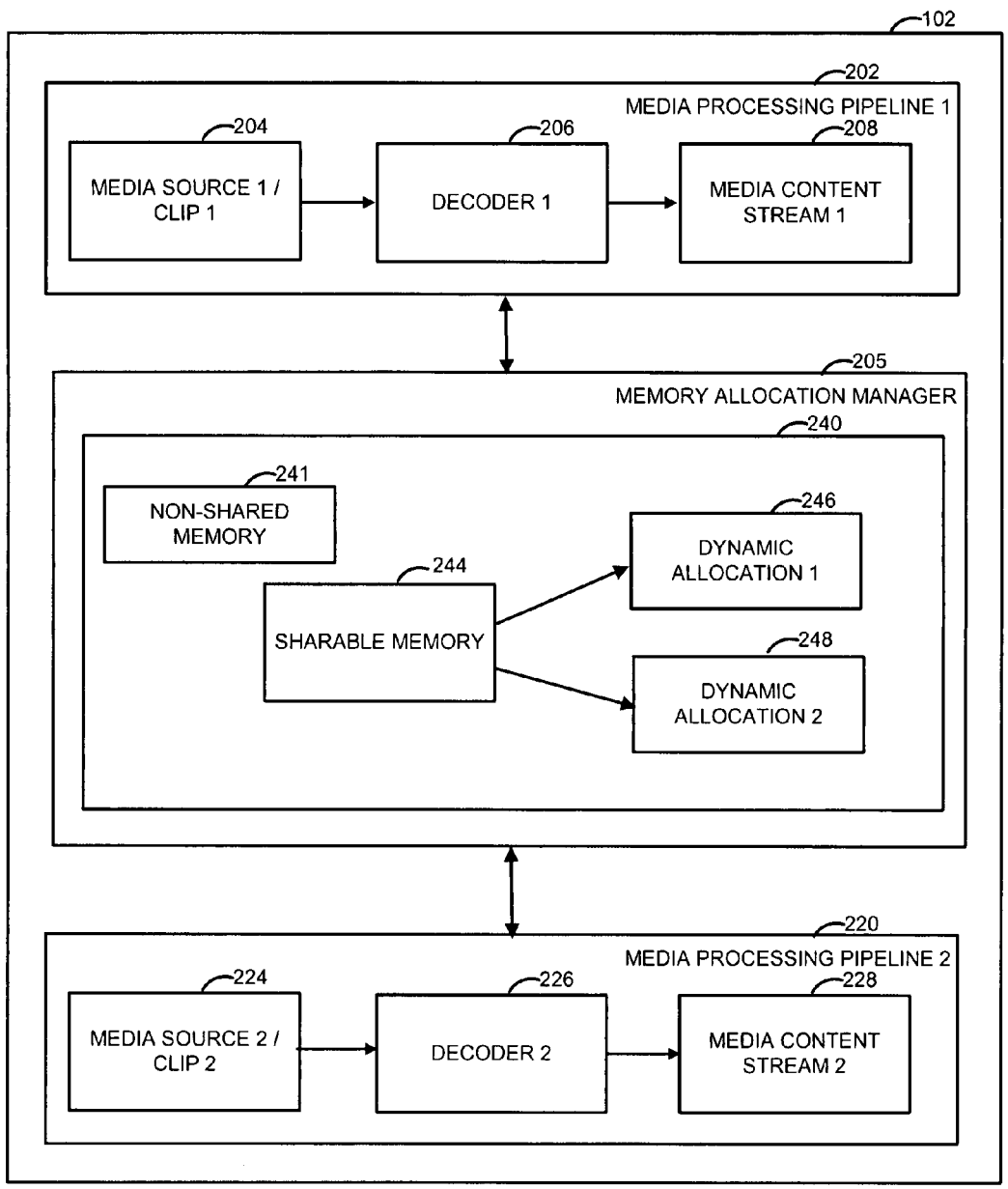
FIG. 2 is a simplified functional block diagram illustrating aspects of the media content manager block of FIG. 1 in more detail.

FIG. 2 is a simplified functional block diagram illustrating aspects of media content manager 102 in more detail. Media content manager 102 includes one or more media processing pipelines (two media processing pipelines are shown, media processing pipeline1 202 and media processing pipeline2 220, although any number of media processing pipelines is possible). Generally, media processing pipeline1 202 and media processing pipeline2 220 are used to prepare independently-controlled media content streams 208 and 228, respectively, for presentation to a user. One media processing pipeline is usually responsible for preparing a primary media content stream, such as a movie, and other media processing pipelines are responsible for preparing one or more secondary media content streams, such as director's commentary, actor biographies, advertising, etc.). It will be appreciated that media content manager 102 may have a dynamic processing load based on the identity and scheduling (pre-determined or based on serendipitous user input 150) of the various clips 123 comprising media component 122 and/or IC component 124.

Contemporaneously preparing upcoming media samples from two or more clips can consume large amounts of computing resources such as memory (used for buffering information, for example) in a manner that is not easily predictable. Moreover, memory resources required to prepare a particular media sample for presentation are not always constant from sample-to-sample or clip-to-clip. Some factors that affect required memory resources are associated with the media samples themselves (including but not limited to factors such as media sample size, media sample source/location, encoding or decoding parameters, and encryption parameters). Other factors that affect required memory resources are associated with the media content player (for example, player architecture or dynamic processing loads, among others), while still other factors that affect required memory resources are associated with user input (user-selected media content, content formats, or play speeds, for example).

To avoid user-perceptible glitches in the presentation of media content, media content rendering generally involves each identifying and preparing for presentation one or more upcoming media samples to be presented to a user, prior to the scheduled play time of the media sample(s). Preparing a particular upcoming media sample for presentation to a user involves multiple steps, including but not limited to identifying the next playable media sample and reading the next playable media sample from a particular media source (discussed further below). Because media content is generally encoded, encrypted and/or compressed, the next playable media sample may be demultiplexed, decoded, and/or decrypted to obtain renderable content from information read from a media source.

Figure 3:
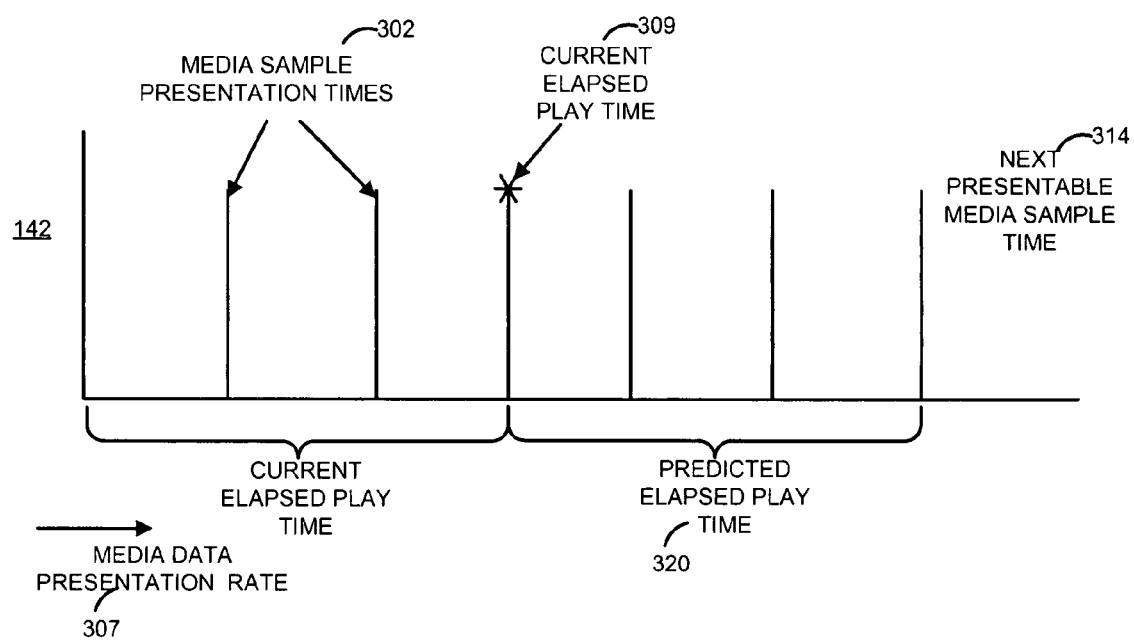
FIG. 3 is a schematic illustrating a media timeline associated with a set of media samples, usable in connection with certain aspects of the media content player shown in FIG. 1 and/or the method shown in the flowchart of FIG. 4.

The step of identifying the next playable media sample is discussed with reference to the exemplary media timeline 142 shown in FIG. 3. Various media sample presentation times 302 are indicated on media timeline 142. Media sample presentation times 302 represent times within the play duration of a particular clip at which one or more media samples are presentable as media data 132. As shown, media sample presentation times 302 occur at a rate based on a predetermined media data presentation rate 307, which may vary from clip-to-clip. Note that it is not necessary for media data presentation rate 307 to be the same as the rate at which a particular clip 123 was encoded, although the media data presentation rate may change based on the encoding rate for a particular clip. Certain user input 150 can also affect the speed of media sample retrieval from media sources and thus affect the rate at which media sample presentation times 302 occur. For example, played presentation 127 may proceed in a forward direction at a normal speed, and may also proceed in both forward and reverse directions at speeds faster or slower than the normal speed. It will appreciated that normal speed is a relative term, and that normal speed may vary from presentation to presentation, and from clip-to-clip. During fast-reverse and fast-forward operations, the playing of certain media content is often skipped. Other user input may cause the playing of certain content to be skipped, such as when the user jumps from one part of the movie to another.

A current elapsed play time 309 (of the play duration) is shown on media timeline 142. A next presentable media sample presentation time 314 is also shown. Next presentable media sample presentation time 314 represents the media sample presentation time 302 associated with the next media sample(s) (after the current media sample associated with current elapsed play time 309) that is presentable to a user. It will be appreciated that the next presentable media sample may be the next consecutive media sample based on playlist 128, or may be a media sample one or more media sample presentation times 302 away from the media sample associated with current elapsed play time 309.

There are various ways to ascertain the next presentable media sample/media sample presentation time 314, which are not discussed in detail herein. Generally, a predicted elapsed play time 320 and the corresponding next presentable media sample are ascertained. Predicted elapsed play time 320 represents the amount of the play duration (in addition to current elapsed play time 309) that will have passed based on the play speed and media frame rate 307. The predicted elapsed play time is used to locate the particular media sample presentation time 302 that will be the next presentable media sample presentation time 314, and the next presentable media sample may be identified.

Referring again to FIG. 2, when media samples of two clips are concurrently presentable to a user, then within media processing pipeline1 202, upcoming media samples associated with a particular clip 123 are identified and retrieved from media source1 204, and are demultiplexed, decoded, and/or decrypted at decoder1 206. Likewise, within media processing pipeline2 220, upcoming media samples associated with another particular clip 123 are identified retrieved from media source2 224, and are demultiplexed, decoded, and/or decrypted at decoder2 226. Media sources are any devices, locations, or data from which media samples are derived or obtained. Decoders are any devices, techniques, or steps used to retrieve renderable media samples from information received from a media sources. Although a one-to-one relationship between decoders and media sources is shown, it will be appreciated that one decoder may serve multiple media sources, and vice-versa.

To efficiently manage the use of memory resources of Presentation System 100, media content manager 102 includes memory allocation manager ("MAM") 205, which is responsive to media processing pipelines 202 and 220. MAM 205 is responsible for dynamically allocating variable amounts of sharable memory for preparing particular upcoming media samples for presentation. In one possible implementation, MAM 205 is a set of computer-executable instructions encoded on a computer-readable storage medium which, when executed, perform aspects of the method shown and discussed further below in connection with FIG. 4. It may be desirable for MAM 205 to be an implementation of one or more API functions (for example, returning memory locations of memory pool 240, discussed further below), which are accessed by authors of instructions for media processing pipelines 202 and 220. In other implementations, MAM 205 may be located in other physical or logical components of Presentation System 100.

Figure 4:
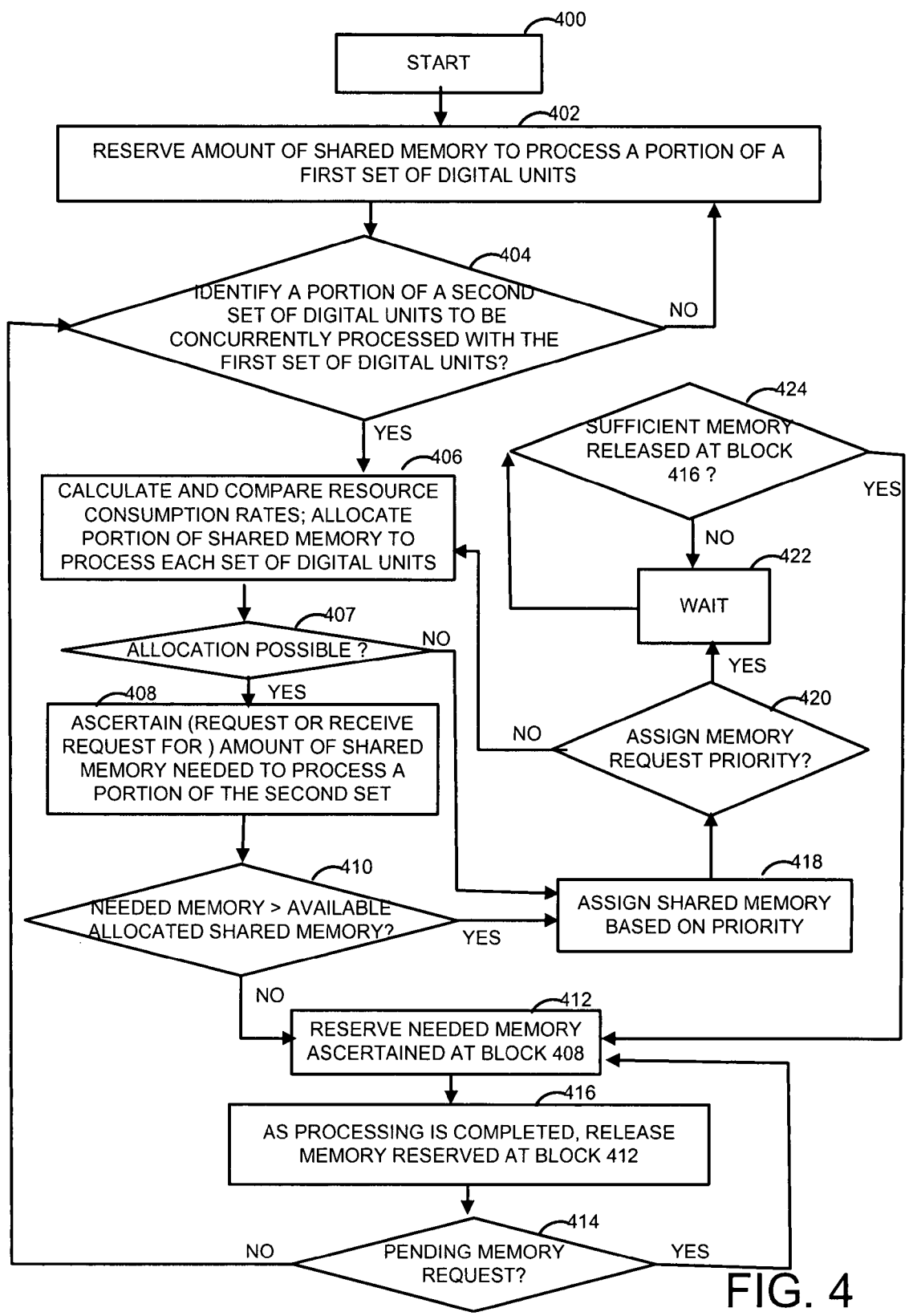
FIG. 4 is a flowchart of a method for concurrently managing a number of sets of digital data using shared memory such as the sharable memory shown in FIG. 2.

Memory pool 240 is an abstract representation of an amount or area (of any size or configuration) of a particular computer-readable storage medium that can be viewed as having units that may be separately allocated, via MAM 205, for use by media processing pipelines 202 and 220 in accordance with certain algorithms (an exemplary algorithm is shown and discussed below, in connection with FIG. 4). One portion of memory pool 240 is referred to as non-shared memory 241, which represents memory units that are restricted for use by either media processing pipeline1 202 or media processing pipeline2 but not both. Another portion of memory pool 240 is referred to as sharable memory 244, which represents memory units that may be allocated for use by either media processing pipeline1 202 or media processing pipeline2 220 or both (or other media processing pipelines as applicable). In an illustrative example, memory pool 240 is 40 MB of RAM, sharable memory 244 is 30 MB, and non-shared memory 241 is 10 MB, with 5 MB of the non-shared memory restricted for use only by media processing pipeline1 202 and 5 MB of the non-shared memory restricted for use only by media processing pipeline2 220.

Dynamic shared memory allocation1 246 represents a total amount of sharable memory 244 that has been allocated (in accordance with resource consumption indicators such as data rates, discussed further below in connection with FIG. 4) for use by media processing pipeline1 202, and dynamic shared memory allocation2 248 represents a total amount of sharable memory 244 that has been allocated for use by media processing pipeline2 220. Generally, variable amounts of shared memory allocation1 246 are requested and reserved by media processing pipeline1 202 to prepare upcoming media samples for presentation, and as the media samples are played to a user, the requested/reserved amounts of shared memory allocation1 246 are released. Likewise, variable amounts of shared memory allocation1 248 are requested and reserved by media processing pipeline2 220 to prepare upcoming media samples for presentation, and as the media samples are played to the user, the requested/reserved amounts of shared memory allocation2 248 are released.

With continuing reference to FIGS. 1-3, FIG. 4 is a flowchart of a method for concurrently managing a number of sets of digital data using shared memory, such as media content arranged into a number of sets (such as clips 123) of sequenced media samples that is managed using sharable memory 244.

The process(es) illustrated in FIG. 4 may be implemented in one or more general, multi-purpose, or single-purpose processors, such as processor 502 discussed below, in connection with FIG. 5. Unless specifically stated, the methods described herein are not constrained to a particular order or sequence. In addition, some of the described method or elements thereof can occur or be performed concurrently.

The method begins at block 400, and continues at block 402, where an amount of shared memory for processing a first set of digital units is reserved. In the context of Presentation System 100, the first set of digital units may be considered to be a particular clip 123 of a movie, rendered (as media content stream1 208) via media processing pipeline 202. When media content stream1 208 is the only media content stream being presented to the user, all available sharable memory 244 may generally be allocated, by MAM 202, to rendering media content stream1 208.

Next, at diamond 404, it is determined whether a second set of digital units is to be concurrently processed with the first set of digital units. In the context of Presentation System 100, the second set of digital units may be considered to be a user-selected secondary media content stream (rendered as media content stream2 228) such as a picture-in-picture director's commentary, an advertisement, or a portion of the movie rendered in high-definition, among other things. When media content stream1 208 and media content stream2 228 are being concurrently rendered, sharable memory 244 will generally be divided, by MAM 205, between use by media processing pipeline1 202 (for identifying and decoding upcoming media samples from media content stream1 208) and use by media processing pipeline2 220 (for identifying and decoding upcoming media samples from media content stream2 228). While sharable memory 244 is specifically discussed, it is noted that the media processing pipelines also generally have access to amounts of non-shared memory 241, which is generally used to begin rendering media samples (which may or may not be the first sequential media samples) from a particular clip/media content stream, and access to sharable memory 244 is in addition to non-shared memory access.

As indicated at block 406, one way to divide use of shared memory between acts associated with processing two sets of digital units concurrently is to allocate the shared memory based on relative resource consumption rates associated with processing the sets of digital units. In the context of Presentation System 100, an exemplary resource consumption rate is an average data rate of a particular media content stream, and an exemplary allocation is an allocation based on a ratio of the average data rates.

An average data rate of a particular media content stream, such as media content stream1 208 and media content stream2 228, may be calculated by dividing the total number of samples currently being rendered from a particular clip (for example, the size of samples being decoded or having been decoded and buffered but not yet played to a user) by the total play time (determined from media timeline 142, for example) of the total number of samples currently being rendered. As upcoming media samples are identified (using media timeline 142, for example) and sharable memory is successfully reserved to render the identified upcoming media samples, and also as rendered media samples are played to a user and memory is successfully released, the average data rate may be updated. For example, assuming as discussed above that sharable memory 244 is 30 MB, that media content stream1 208 has an average data rate of 40 MB/sec, and that media content stream2 228 has an average data rate of 20 MB/sec, then the ratio of data rates between media content stream1 208 and media content stream2 228 would be 2:1, and the allocation of sharable memory 244 based on the ratio would be 20 MB to media processing pipeline1 202 for rendering media content stream1 208 and 10 MB to media processing pipeline2 220 for rendering media content stream1 228.

Sometimes, as indicated at diamond 407, it may not be possible to immediately allocate sharable memory 244 in the desired amounts based on the calculated ratio (for example, one or both media processing pipelines may have previously reserved memory at block 412, as discussed below, that has not yet been released). If the desired allocation is not currently possible, then one solution is to assign available sharable memory based on a priority scheme, as indicated at block 418. If a memory request priority is to be assigned, as indicated at diamond 420, then as discrete amounts of sharable memory are released (see diamond 424) at block 416, and those amounts of sharable memory are in excess of the desired allocation (based on the ratio of average data rates) for the media processing pipeline releasing them, they may be immediately re-allocated in accordance with the pending memory request priority.

Assuming that it is possible at diamond 407 to immediately allocate sharable memory 244 in the desired amounts based on the ratio calculated at block 406, then, at block 408, the steps of requesting and/or reserving particular amounts of allocated shared memory for processing portions of the sets of digital units are performed. In the context of Presentation System 100, both media processing pipeline1 202 and media processing pipeline2 220 request (from MAM 205, for example) reservations of discrete amounts of previously allocated sharable memory 244, which are required to render identified upcoming media samples (identified based on media timeline 142, for example). Memory resources required to prepare individual media samples are not always constant from sample-to-sample or clip-to-clip, being affected by factors such as media sample size, media source location or identity, encoding or decoding parameters, media sample presentation format, compression parameters, encryption parameters, play speed, dynamic processing loads of the media content player, and other factors.

If it is determined at diamond 410 that there exists sufficient, unreserved sharable memory 244 (allocated at block 206) to fulfill a request for the discrete amount of memory required to render a particular upcoming media sample of a particular clip/media content stream, then the amount of requested memory is reserved (by MAM 205, for example) on behalf of the requesting media processing pipeline, as indicated at block 412. Generally, the reservation reduces the amount of sharable memory 244 (allocated at block 206) available to the requesting media processing pipeline. It is noted that such a reservation may also independently affect the calculation at block 406 of the average data rate of the applicable media content stream.

As indicated at block 416, as processing (for example, presentation to a user of media data 132) is completed, the discrete amounts of memory reserved at block 412 are released by MAM 205. Generally, the release increases the amount of sharable memory 244 (allocated at block 206) available to the releasing media processing pipeline. In the case where, at block 406, the desired allocation of sharable memory 244 could not be immediately implemented and the amounts of released memory are in excess of the desired allocation for the releasing media content pipeline, then the released memory may be immediately re-allocated in accordance with the desired allocation calculated at block 406. Likewise, if there are pending memory request priorities as indicated at diamond 414 (discussed further below), the pending memory request priorities are fulfilled.

Returning again to diamond 410, assuming that the desired allocation has been implemented but it is determined (for one or more media processing pipelines) that there is insufficient unreserved sharable memory 244 (allocated at block 206) to fulfill a request for the discrete amount of memory required to render a particular upcoming media sample, then the available sharable memory is assigned based on a priority scheme, as indicated at block 418. In one possible priority scheme, a higher priority is given to assigning sharable memory to the media processing pipeline that currently has less than its allocated portion of the sharable memory. Alternative schemes are possible, for example, giving a higher priority to assigning sharable memory to the media processing pipeline having the media content stream with the higher average data rate. For example, assume that both media processing pipelines have requested sharable memory in excess of their allotments calculated at block 406. If at block 420, a memory request priority is assigned to the media processing pipeline that currently has less than its allocated portion of the sharable memory, the other media processing pipeline may receive a lower memory request priority or no memory request priority. After receiving a memory request priority, the media processing pipeline waits, as indicated at block 422, until sufficient memory is released at block 416 (by the waiting media processing pipeline or by either media processing pipeline), and the released memory is immediately reserved in accordance with the memory request priority(ies).

In another example, assume that one media processing pipeline has requested sharable memory in excess of its allotment calculated at block 406. One solution would be to assign a memory request priority if the media processing pipeline currently has less than its allocated portion of the sharable memory, and not to assign a memory request priority if the requesting media processing pipeline does have its allocated portion of the sharable memory. When a memory request priority is assigned, then the media processing pipeline waits, as indicated at block 422, until sufficient memory is released at block 416 by either media processing pipeline, and the released memory is immediately reserved in accordance with the memory request priority(ies).

As indicated at diamond 420, when memory request priorities are not assigned, one solution is to required the media processing pipeline to repeatedly re-request the discrete amounts of memory until the required memory is available (for example, either the allocation calculated at block 406 changes, and/or the other media processing pipeline releases memory in excess of its current allocation).

As indicated at diamond 414, pending memory request priorities are served, generally in priority or time order. It may be desirable to re-set memory request priorities at the time sharable memory 244 is re-allocated at block 206. Such re-allocation may occur at various times independent of the media sample presentation times illustrated in media timeline 142. If there are no pending memory request priorities, and a media data stream stops, the method returns to block 402, where all available sharable memory 244 is available to the other media data stream(s) being rendered.

Figure 5:
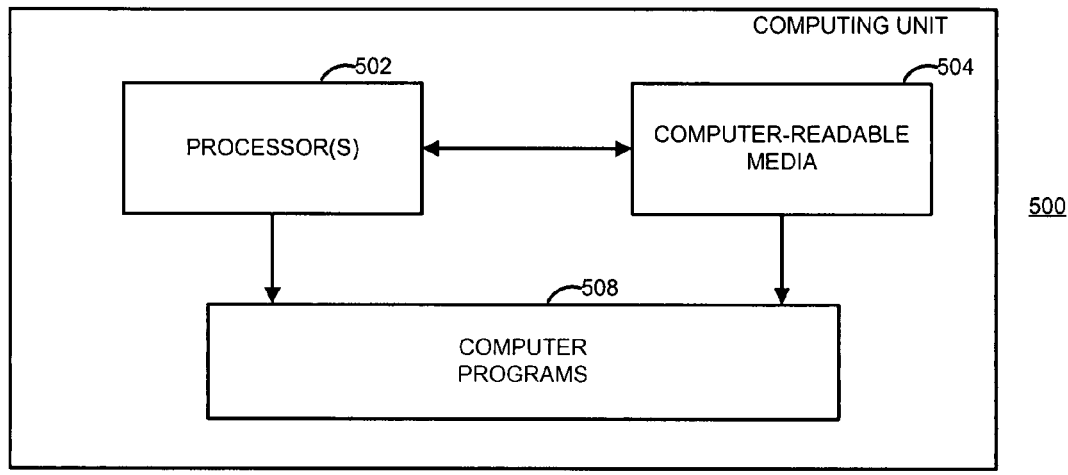
FIG. 5 is a simplified functional block diagram of an exemplary configuration of computing unit.

FIG. 5 is a block diagram of a general-purpose computing unit 500, illustrating certain functional components that may be used to implement, may be accessed by, or may be included in, various functional components of Presentation System 100. One or more components of computing unit 500 may be used to implement, be accessible by, or be included in, IC manager 104, presentation manager 106, and media content manager 102. For example, one or more components of FIG. 5 may be packaged together or separately to implement functions of Presentation System 100 (in whole or in part) in a variety of ways.

One or more processors 502 are responsive to computer-readable media 504 and to computer programs 506. Processor(s) 502, which may be physical or virtual processors, control functions of an electronic device by executing computer-executable instructions. Processor(s) 502 may execute instructions at the assembly, compiled, or machine-level to perform a particular process. Such instructions may be created using source code or any other known computer program design tool.

Computer-readable media 504 represent any number and combination of local or remote devices, in any form, now known or later developed, capable of recording, storing, or transmitting computer-readable data, such as the instructions executable by processor 502. In particular, computer-readable media 504 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; a paper tape; a punch card; or any combination thereof.

Computer programs 506 represent any signal processing methods or stored instructions that electronically control predetermined operations on data. In general, computer programs 506 are computer-executable instructions implemented as software components according to well-known practices for component-based software development, and encoded in computer-readable media (such as computer-readable media 504). Computer programs may be combined or distributed in various ways.

Functions/components described in the context of Presentation System 100 are not limited to implementation by any specific embodiments of computer programs. Rather, functions are processes that convey or transform data, and may generally be implemented by, or executed in, hardware, software, firmware, or any combination thereof, located at, or accessed by, any combination of functional elements of Presentation System 100.

Figure 6:
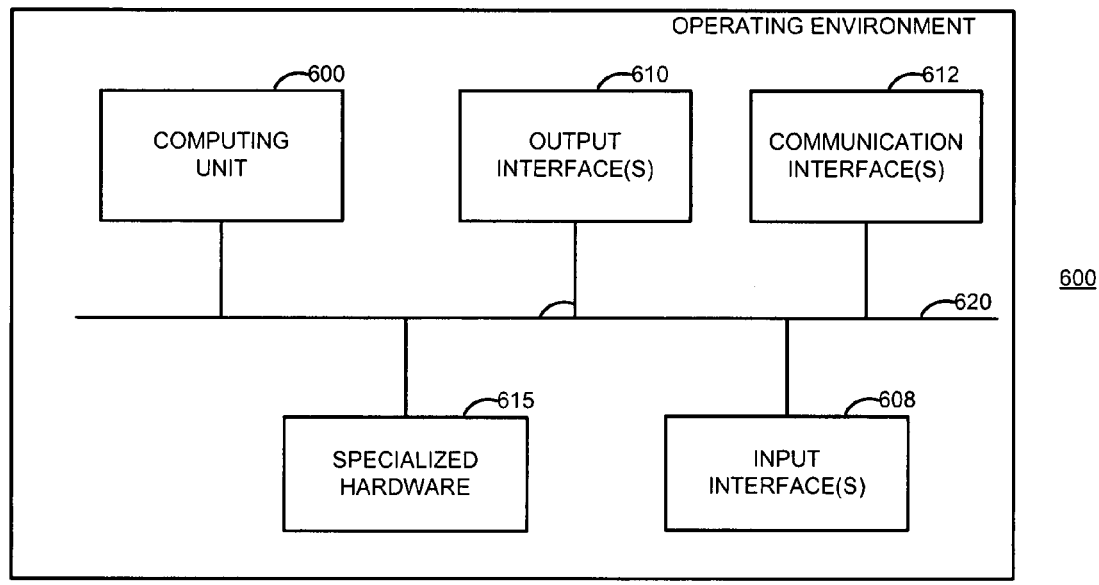
FIG. 6 is a block diagram of an exemplary configuration of an operating environment in which all or part of the media content player shown in FIG. 1, the method shown in FIG. 4, and/or the computing unit shown in FIG. 5 may be implemented or used.

With continued reference to FIG. 5, FIG. 6 is a block diagram of an exemplary configuration of an operating environment 600 in which all or part of computing unit 500 or Presentation System 100 may be implemented or used. Operating environment 600 is generally indicative of a wide variety of general-purpose or special-purpose computing environments. Operating environment 600 is only one example of a suitable operating environment and is not intended to suggest any limitation as to the scope of use or functionality of the system(s) and methods described herein. For example, operating environment 600 may be a type of computer, such as a personal computer, a workstation, a server, a portable device, a laptop, a tablet, or any other type of electronic device, such as an optical media player or another type of media player, now known or later developed, or any aspect thereof. Operating environment 600 may also be a distributed computing network or a Web service, for example. A specific example of operating environment 600 is an environment, such as a DVD player or an operating system associated therewith, which facilitates playing high-definition DVD movies.

As shown, operating environment 600 includes or accesses components of computing unit 500, including processor 502, computer-readable media 504, and computer programs 506. One or more internal buses 620, which are well-known and widely available elements, may be used to carry data, addresses, control signals and other information within, to, or from computing environment 600 or elements thereof.

Input interface(s) 608 provide input to computing environment 600. Input may be collected using any type of now known or later-developed interface, such as a user interface. User interfaces may be touch-input devices such as remote controls, displays, mice, pens, styluses, trackballs, keyboards, microphones, scanning devices, and all types of devices that are used input data.

Output interface(s) 610 provide output from operating environment 600. Examples of output interface(s) 610 include displays, printers, speakers, drives (such as optical disc drives and other disc drives), and the like.

External communication interface(s) 612 are available to enhance the ability of operating environment 600 to receive information from, or to transmit information to, another entity via a communication medium such as a channel signal, a data signal, or a computer-readable medium. External communication interface(s) 612 may be, or may include, elements such as cable modems, data terminal equipment, media players, data storage devices, personal digital assistants, or any other device or component/combination thereof, along with associated network support devices and/or software or interfaces. Specialized hardware 615 represents any hardware or firmware that implements functions of operating environment 600, such as transceivers, codecs, specialized circuits, disk drives, and the like.

Figure 7:
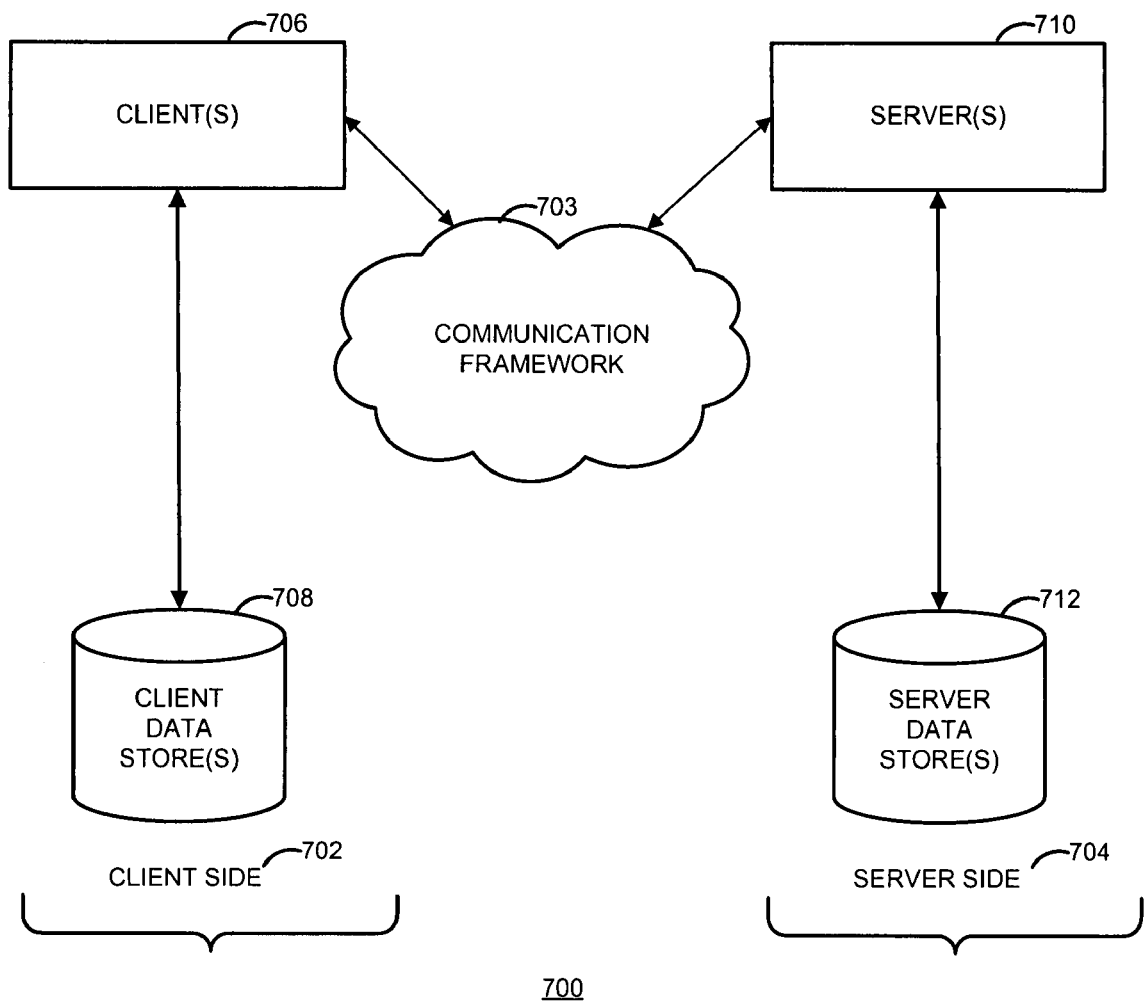
FIG. 7 is a simplified functional block diagram of a client-server architecture in which aspects of the operating environment shown in FIG. 6 may be implemented or used.

FIG. 7 is a simplified functional diagram of a client-server architecture 700 in connection with which the Presentation System 100, computing unit 500, or operating environment 600 may be used. One or more aspects of Presentation System 100, computing unit 500 and/or operating environment 600 may be represented on a client-side 702 of architecture 700 or on a server-side 704 of architecture 700. As shown, communication framework 703 (which may be any public or private network of any type, for example, wired or wireless) facilitates communication between client-side 702 and server-side 704.

On client-side 702, one or more clients 706, which may be implemented in hardware, software, firmware, or any combination thereof, are responsive to client data stores 708. Client data stores 708 may be computer-readable media 504, employed to store information local to clients 706. On server-side 704, one or more servers 710 are responsive to server data stores 712. Like client data stores 708, server data stores 712 may include one or more computer-readable media 504, employed to store information local to servers 710.

Various aspects of a presentation system that is used to present interactive content to a user synchronously with media content have been described. It will be understood, however, that all of the described components of the presentation system need not be used, nor must the components, when used, be present concurrently. Functions/components described in the context of Presentation System 100 as being computer programs are not limited to implementation by any specific embodiments of computer programs. Rather, functions are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A computer-readable storage medium encoded with computer-executable instructions which, when executed by a processor, perform a method for managing digital data using a memory pool having an amount of sharable memory, the digital data comprising a plurality of sets of sequenced units of digital data, the method comprising:
identifying a first set of units of digital data having a first sequence;
identifying a second set of units of digital data having a second sequence;
when a portion of the first set is to be processed contemporaneously with a portion of the second set,
ascertaining a first resource consumption indicator associated with processing some of the units of digital data in the first sequence;

ascertaining a second resource consumption indicator associated with processing some of the units of digital data in the second sequence;

calculating a ratio of the first resource consumption indicator with respect to the second resource consumption indicator; and in accordance with the ratio, dynamically allocating the amount of sharable memory in the memory pool between both acts associated with processing the first set and acts associated with processing the second set.

2. The computer-readable storage medium according to claim 1, wherein the method further comprises:

when a portion of the first set is not to be contemporaneously processed with a portion of the second set, dynamically allocating the amount of sharable memory in the memory pool to either acts associated with processing the first set or acts associated with processing the second set, but not both.

3. The computer-readable storage medium according to claim 1, wherein the first and second resource consumption indicators comprise average resource consumption rates associated with processing the first and second sets of units of digital data, respectively.

4. The computer-readable storage medium according to claim 1, wherein the method further comprises:

when a portion of the first set is to be processed contemporaneously with a portion of the second set, ascertaining that an amount of available sharable memory is insufficient for allocation in accordance with the ratio;

assigning a priority to either acts associated with processing the first set of digital units or acts associated with processing the second set of digital units; and dynamically allocating the amount of sharable memory in the memory pool based on the assigned priority.

5. The computer-readable storage medium according to claim 4, wherein the step of allocating the amount of sharable memory in the memory pool based on the priority comprises when the priority is assigned to acts associated with processing the first set, allocating the amount of sharable memory in the memory pool to acts associated with processing the first set, and when the priority is assigned to acts associated with processing the second set, dynamically allocating the amount of sharable memory in the memory pool to acts associated with processing the second set.

6. The computer-readable storage medium according to claim 1, wherein either the first sequence or the second sequence or both are either pre-determined or dynamically determined.

7. A computer-readable storage medium encoded with computer-executable instructions which, when executed by a processor, perform a method for rendering media content using a sharable memory pool, the media content arranged into a plurality of sets of sequenced media samples, the method comprising:

identifying a first set of media samples receivable from a first media source;

identifying a second set of media samples receivable from a second media source;

calculating a first data rate associated with rendering the first set of media samples;

calculating a second data rate associated with rendering the second set of media samples;

comparing the first data rate to the second data rate; and based on the step of comparing, dynamically allocating a first amount of memory from the sharable memory pool for rendering the first set of media samples, and a second amount of memory from the sharable memory pool for contemporaneously rendering the second set of media samples.

8. The computer-readable medium according to claim 7, the method further comprising:

identifying a first upcoming media sample from the first set of media samples;

identifying a second upcoming media sample from the second set of media samples, the second upcoming media sample to be rendered contemporaneously with the first upcoming media sample;

ascertaining a first desired memory amount for rendering the first upcoming media sample;

ascertaining a second desired memory amount for rendering the second upcoming media sample;

when an amount of memory available from the sharable memory pool is sufficient for dynamically allocating both the first desired memory amount and the second desired memory amount, dynamically allocating the first desired memory amount for rendering the first upcoming media sample and reducing the amount of memory available from the sharable memory pool by the first desired memory amount, and dynamically allocating the second desired memory amount for rendering the second upcoming media sample and reducing the amount of memory available from the sharable memory pool by the second desired memory amount; and when an amount of memory available from the sharable memory pool is insufficient for dynamically allocating both the first desired memory amount and the second dynamic memory amount, either dynamically allocating the first desired memory amount for rendering the first upcoming media sample and reducing the amount of memory available from the sharable memory pool by the first desired memory amount, or dynamically allocating the second desired memory amount for rendering the second upcoming media sample and reducing the amount of memory available from the sharable memory pool by the second desired memory amount.

9. The computer-readable medium according to claim 8, wherein when an amount of memory available from the sharable memory pool is insufficient for dynamically allocating both the first desired memory amount and the second dynamic memory amount, dynamically allocating the first desired memory amount when the first data rate is higher than the second data rate, and dynamically allocating the second desired memory amount when the second data rate is higher than the first data rate.

10. The computer-readable medium according to claim 8, the method further comprising:

when the first desired memory amount has been dynamically allocated, after the first upcoming media sample has been rendered, increasing the amount of memory available from the sharable memory pool by the first desired memory amount; and when the second desired memory amount has been dynamically allocated, after the second upcoming media sample has been rendered, increasing the amount of memory available from the sharable memory pool by the second desired memory amount.

11. The computer-readable medium according to claim 8, the method further comprising:

when an amount of memory available from the sharable memory pool is insufficient for dynamically allocating both the first desired memory amount and the second dynamic memory amount, assigning a memory allocation priority to the first desired memory amount when the second desired memory amount was dynamically allocated, or assigning an allocation priority to the second desired memory amount when the first desired memory amount was dynamically allocated;

when the allocation priority is assigned to the first desired memory amount and the amount of memory available from the sharable memory pool becomes equal to or greater than the first desired memory amount, automatically dynamically allocating the first desired memory amount from the sharable memory pool; and when the allocation priority is assigned to the second desired memory amount and the amount of memory available from the sharable memory pool becomes equal to or greater than the second desired memory amount, automatically dynamically allocating the first desired memory amount from the sharable memory pool.

12. The computer-readable medium according to claim 7, wherein the first media source is the same as or different than the second media source, and wherein media samples are selected from the group consisting of: bits; frames; data packets; groups of pictures; and enhanced video object units.

13. The computer-readable medium according to claim 7, wherein the step of comparing comprises calculating a ratio of the first data rate with respect to the second data rate, and wherein the step of dynamically allocating comprises dynamically allocating in accordance with the ratio.

14. The computer-readable medium according to claim 7, wherein the first data rate comprises an average data rate calculated based on information selected from the group consisting of: a rendering speed of the first set of media samples; a characteristic of the presentation system; and a characteristic of the first media source, and wherein the second data rate comprises an average data rate calculated based on information selected from the group consisting of: a rendering speed of the second set of media samples; a characteristic of the presentation system; and a characteristic of the second media source.

15. The computer-readable medium according to claim 14, wherein the characteristics of the presentation system are selected from the group consisting of: a play state of the first set of media samples or the second set of media samples or both; a processing load within the presentation system; and a frequency of a clock associated with the presentation system.

16. The computer-readable medium according to claim 14, wherein the characteristics of the first and second media sources are selected from the group consisting of: encoder-decoder pair parameters; and encryption parameters.

17. The computer-readable medium according to claim 14, wherein the step of calculating an average data rate associated with rendering media samples of the first set comprises ascertaining an amount of memory of the sharable memory pool currently allocated for rendering the first set of media samples, ascertaining a size of a first number of media samples of the first set that are currently being rendered, ascertaining a first amount of time associated with playing to a user the first number of media samples, and dividing the size of the first number of media samples by the first amount of time, and wherein the step of calculating an average data rate associated with rendering media samples of the second set comprises ascertaining an amount of memory of the sharable memory pool currently allocated for rendering the second set of media samples, ascertaining a size of a second number of media samples of the second set that are currently being rendered, ascertaining a second amount of time associated with playing to a user the second number of media samples, and dividing the size of the second number of media samples by the second amount of time.

18. A system for rendering media content arranged into a plurality of sets of sequenced media samples, the system comprising:

a media content manager operable to arrange for rendering of a first set of media samples from a first media source and to arrange for rendering of a second set of media samples from a second media source;

a presentation manager configured for communication with the media content manager, the presentation manager operable to identify when a first media sample from the first set is to be rendered contemporaneously with a second media sample from the second set; and a memory allocation manager responsive to the media content manager and the presentation manager, the memory allocation manager managing a sharable memory pool and operable to ascertain a first data rate associated with rendering the first set of media samples;

ascertain a second data rate associated with rendering the second set of media samples;

compare the first data rate to the second data rate; and based on the comparison, dynamically allocate a first amount of memory from the sharable memory pool for rendering the first media sample from the first set of media samples and a second amount of memory from the sharable memory pool for contemporaneously rendering the second media sample from the second set of media samples.

19. The system according to claim 18, wherein the system comprises an operating system.

20. The system according to claim 18, wherein the system comprises a digital media player.

* * * * *